US012338690B1

(12) United States Patent
Gray

(10) Patent No.: US 12,338,690 B1
(45) Date of Patent: Jun. 24, 2025

(54) CONDUCTIVE BRIDGING OF A TUBING ENCAPSULATED CONDUCTOR FOR POWERING EQUIPMENT IN WELLBORE OPERATIONS

(71) Applicant: Halliburton Energy Services, Inc., Houston, TX (US)

(72) Inventor: Matthew S. Gray, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/649,396

(22) Filed: Apr. 29, 2024

(51) Int. Cl.
*E21B 17/02* (2006.01)
*H01R 12/67* (2011.01)

(52) U.S. Cl.
CPC .......... *E21B 17/028* (2013.01); *E21B 17/026* (2013.01); *H01R 12/67* (2013.01)

(58) Field of Classification Search
CPC ...... E21B 17/026; E21B 17/028; H01R 12/67
See application file for complete search history.

(56) References Cited

U.S. PATENT DOCUMENTS

| | | | | |
|---|---|---|---|---|
| 7,658,230 | B2 | 2/2010 | Kimiadi | |
| 9,458,705 | B2 | 10/2016 | Semple et al. | |
| 2006/0124318 | A1 | 6/2006 | Sheffield | |
| 2014/0273580 | A1 | 9/2014 | Ring et al. | |
| 2017/0133124 | A1 | 5/2017 | Thomas et al. | |
| 2018/0112513 | A1* | 4/2018 | Saldanha | E21B 47/12 |
| 2018/0216434 | A1 | 8/2018 | Bolding et al. | |
| 2018/0219328 | A1 | 8/2018 | Yuratich | |
| 2018/0374611 | A1 | 12/2018 | Gissler et al. | |
| 2020/0211735 | A1 | 7/2020 | Hernandez Marti et al. | |
| 2021/0238945 | A1 | 8/2021 | Angers | |

FOREIGN PATENT DOCUMENTS

| | | | |
|---|---|---|---|
| EP | 2992167 | A2 | 3/2016 |

OTHER PUBLICATIONS

Prysmian Group , "Tubing Encapsulated Cable", 6 pages.
International Patent Application No. PCT/US2024/030582, International Search Report and Written Opinion mailed Jan. 20, 2025, 9 pages.

* cited by examiner

*Primary Examiner* — Kristyn A Hall
(74) *Attorney, Agent, or Firm* — Kilpatrick Townsend & Stockton, LLP

(57) ABSTRACT

A system includes a production tubing string. The system can also include a tubing encapsulated conductor (TEC). At least a portion of the TEC can contact the production tubing string at one or more locations along a length of the production tubing string. The TEC can include an interior wire to transmit electric power from a power source to at least one piece of electrical equipment during a wellbore operation performed with respect to the wellbore. The TEC can also include a metal sheath positioned around the interior wire and an encapsulation layer positioned on an outer side of the metal sheath. Further, the TEC can include a conductive bridging component positioned to pierce the encapsulation layer to contact the metal sheath and to facilitate an electrical coupling between the metal sheath and the production tubing string at a location along the length of the production tubing string.

20 Claims, 3 Drawing Sheets

CONDUCTIVE BRIDGING OF A TUBING ENCAPSULATED CONDUCTOR FOR POWERING EQUIPMENT IN WELLBORE OPERATIONS

TECHNICAL FIELD

The present disclosure relates generally to wellbore operations and, more particularly (although not necessarily exclusively), to a tubing encapsulated conductor with a conductive bridging component for supplying power to electrical equipment used in wellbore operations.

BACKGROUND

A wellbore can be formed in a subterranean formation for extracting produced hydrocarbon or other suitable material. Wellbore operations can be performed to extract the produced hydrocarbon material, and may include deployment, completion, and production operations. As part of performing a deployment operation, electrical equipment, such as a sensors, valves, and pumps, may be deployed downhole in the wellbore. Power can be supplied to the electrical equipment during deployment via a control line, such as a Tubing Encapsulated Conductor (TEC). The TEC can be encapsulated by a plastic-like polymer suitable for well conditions. The plastic-like polymer can provide electrical insulation on an outer surface of the TEC. Due to the insulation, both a positive electrical path and a ground side electrical path must flow through the TEC during deployment operations. In particular, the positive electrical path can flow from the power source to the electrical equipment via conductors of the TEC and the ground side electrical path can flow back to the power source through a metal sheath of the TEC. The metal sheath can exhibit high electrical resistance causing power requirements for powering the electrical equipment via the TEC to be high during deployment operations. Thus, using the metal sheath as a ground may limit or prohibit essential functions of the electrical equipment.

Additionally, after deployment operations, the TEC can be connected to a production tubing hanger, at which point the ground side electrical path can flow through the production tubing hanger, downhole tubing, or a combination thereof of the wellbore rather than the metal sheath. The production tubing hanger and the downhole tubing can exhibit significantly less electrical resistance than the metal sheath. Therefore, during well preparations, deployment of the electrical equipment, system integration tests, deck testing, etc. power requirements for the electrical equipment can be significantly higher than power requirements after the TEC is connected to the production tubing hanger. This can result in inefficient or inconsistent functioning of the electrical equipment and can limit types of electrical equipment that can be used during wellbore operations.

DETAILED DESCRIPTION

Certain aspects and examples of the present disclosure relate to a Tubing Encapsulated Conductor (TEC) with a conductive encapsulation layer for supplying power to downhole electrical equipment used in wellbore operations. The TEC can be a type of electrical control line that includes one or more conductors surrounded by a protective tubing or sheath. In particular, the one or more conductors can be wires made of copper, aluminum, or other suitable materials. Each of the one or more conductors can be surrounded by an insulated tubing for protection and electrical and mechanical isolation. Then a filler material, such as epoxy resin, polyurethane, silicone, etc., can be used to fill voids between the one or more conductors and a metal sheath. The filler material can provide mechanical stability and can prevent movement or deformation of the one or more conductors within the TEC. The metal sheath can be another protective barrier that encompasses the one or more conductors and the filler. In particular, the metal sheath can act as a pressure barrier for the one or more conductors and can be compatible with a downhole environment of the wellbore. Additionally, an encapsulation layer can make up an outermost layer of the TEC. In an example, a conductive bridging component can be added at certain locations of the TEC. The conductive bridging component can include conductive legs, or prongs, that pierce the encapsulation layer to make electrical contact with the metal sheath.

In some examples, the conductive bridging component can provide a direct conductive path between the metal sheath and any conductive item, such as the tubing, that the conductive bridging component installed on the TEC may be touching during testing and deployment operations. As a result, a ground side electrical path can flow from the metal sheath to the tubing. Due to tubing exhibiting a lower electrical resistance than the metal sheath, the conductive path facilitated by the conductive bridging component can reduce electrical resistance associated with grounding the TEC during testing and deployment operations. In this way, functioning of the electrical equipment can be improved and a variety of electrical equipment can be implemented downhole. Additionally, due to the conductive bridging component, there can be conductive paths between layers of TEC while on a drum of control line to improve system integration and deck testing.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
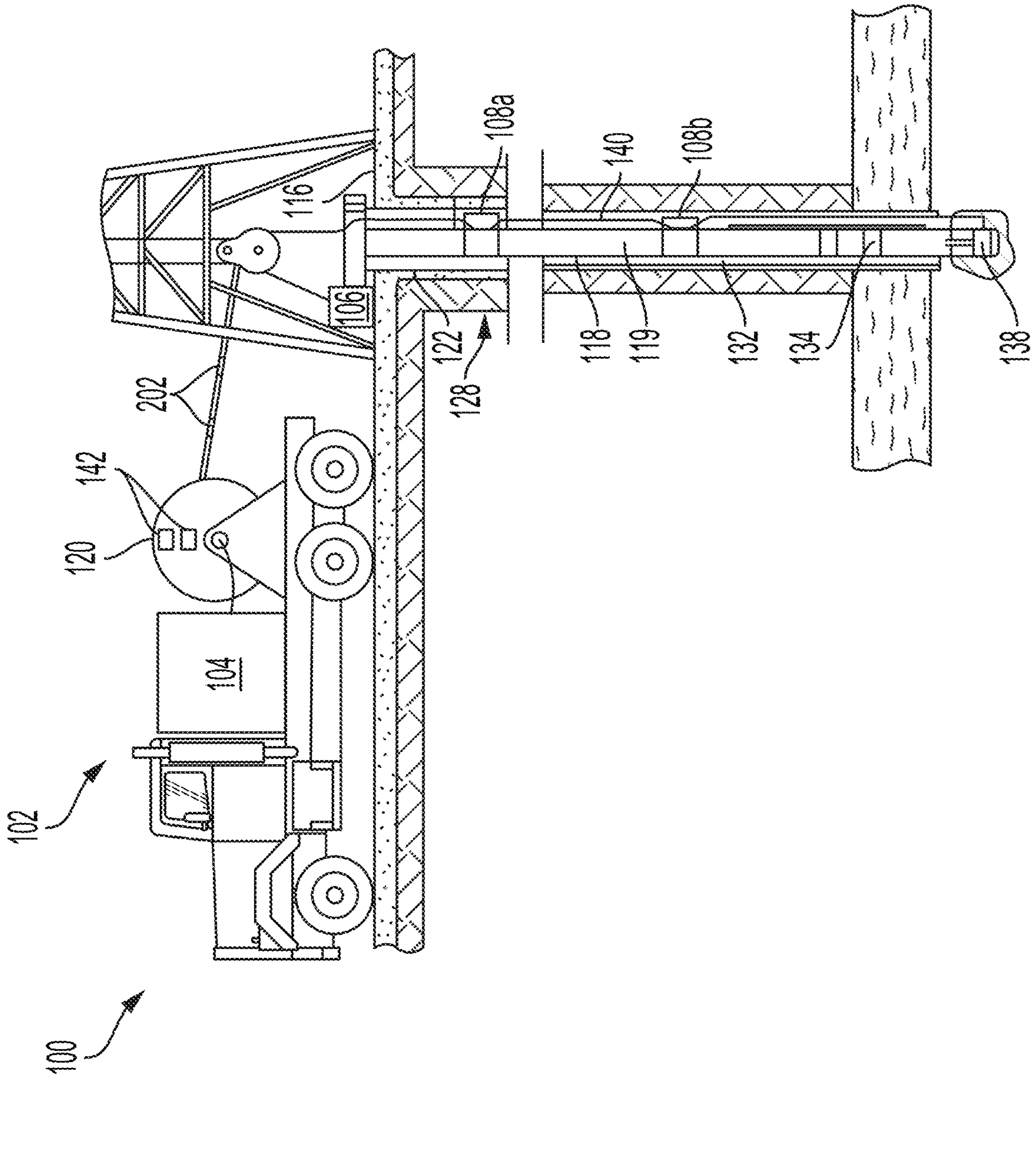
FIG. 1 is a schematic of a well system having a production tubing system for deploying production tubing in a well operation according to one example of the present disclosure.

FIG. 1 is a schematic of a well system 100 having a production tubing system 102 for retrievably deploying production tubing 118 in a well operation. Although a land-based production tubing system 102 is depicted in FIG.

1, a production tubing string can be deployed from floating rigs, jackups, platforms, subsea wellheads or any other well location. Aspects of the disclosure may be used for producing hydrocarbons from a wellbore 122.

The well system 100 has the production tubing system 102, which generally utilizes a production tubing string 118, e.g., to conduct various deployment, drilling, and production operations. As used herein, the term "production tubing string" can include any pipe string that may be deployed in a wellbore 122 including continuous metal tubulars such as low-alloy carbon-steel tubulars, composite tubulars, capillary tubulars and the like. Additionally, although a production tubing system 102 with production tubing string 118 is depicted, the well system 100 can include any type of tubing. For example, completion tubing may be used in place of the production tubing string 118.

The production tubing string 118 can include an inner annulus or flow bore 119 extending along a length of the tubing string 118. The production tubing system 102 may also include a power source 104 and a command station 106 for controlling wellbore operations. Thus, the production tubing system 102 may be used in this example for servicing a pipe system 128. For purposes of this disclosure, the pipe system 128 may include casing, risers, tubing, drill strings, completion or production strings, subs, heads or any other pipes, tubes or equipment that couples or attaches to the foregoing, such as collars, cleaning tools, and couplings, as well as the wellbore 122 itself and laterals in which the pipes, casing and strings may be deployed. In this regard, the pipe system 128 may include one or more casing strings, which may be cemented in wellbore 122. An annulus 132 is formed between the walls of sets of adjacent tubular components, such as concentric casing strings or the exterior of production tubing string 118 and an inside wall of wellbore 122.

A permanent downhole gauge carrier 134 or a series of permanent downhole gauge carriers may be coupled to a downhole end of the production tubing string 118. Disposed downhole of the permanent downhole gauge carrier(s) 134 may be electrical equipment 138, which may include motors, valves, etc. A tubing encapsulated conductor (TEC) 140 can run from a drum 120 located at a surface 116, proximate to the production tubing string 118, and may be electrically coupled to the permanent downhole gauge carrier 134. The TEC 140 may include electrical conductors and may operably couple the permanent downhole gauge carrier 134 to the command station 106. Thus, the TEC 140 may be used as a conduit for electric power.

For example, the conductors can be one or more interior wires, which can transmit electric power from the power source 104 to the permanent downhole gauge carrier 134, the electrical equipment 138, or a combination thereof. The TEC 140 can further include a metal sheath positioned around the one or more interior wires to act as a pressure barrier. Additionally, the outermost layer of the TEC 140 can be an encapsulation layer. One or more conductive bridging components, as discussed below with respect to FIGS. 2 and 3, may puncture the encapsulation layer at various locations along a length of the TEC 140 to form a conductive bridge between the metal sheath of the TEC 140 and a conductive item running to the surface, such as a casing string or the production tubing string 118 of the wellbore at various locations. For example, as depicted, cross-coupling clamps 108*a-b* may be used for coupling the TEC 140 and the production tubing string 118. In such an example, the conductive bridging component can facilitate electrical connections between the metal sheath and the conductive item at the various locations of the cross-coupling clamps 108*a-b*. As a result, the power source 104 can efficiently power the permanent downhole gauge carrier 134, the electrical equipment 138, or a combination thereof via the TEC 140.

Additonally, in some examples, a portion of the TEC 140 can be positioned downhole in the wellbore 122 and a second portion of the TEC 140 can be positioned on the drum 120 associated with the wellbore 122. For the portion of the TEC 140 coiled around the drum 120, conductive bridge components 202 can be installed on the TEC 140 in a manner that facilitates electrical connections 142 between layers of the second portion of TEC 140. That is, the conductive bridge components 202 may be installed such that that the conductive bridge components 202 contact one another while at least a portion of the TEC 140 is stored on the drum 120. As a result, the electrical connections 142 can reduce conductive resistance during testing prior to deploying the TEC 140 into the wellbore 122.

Figure 2:
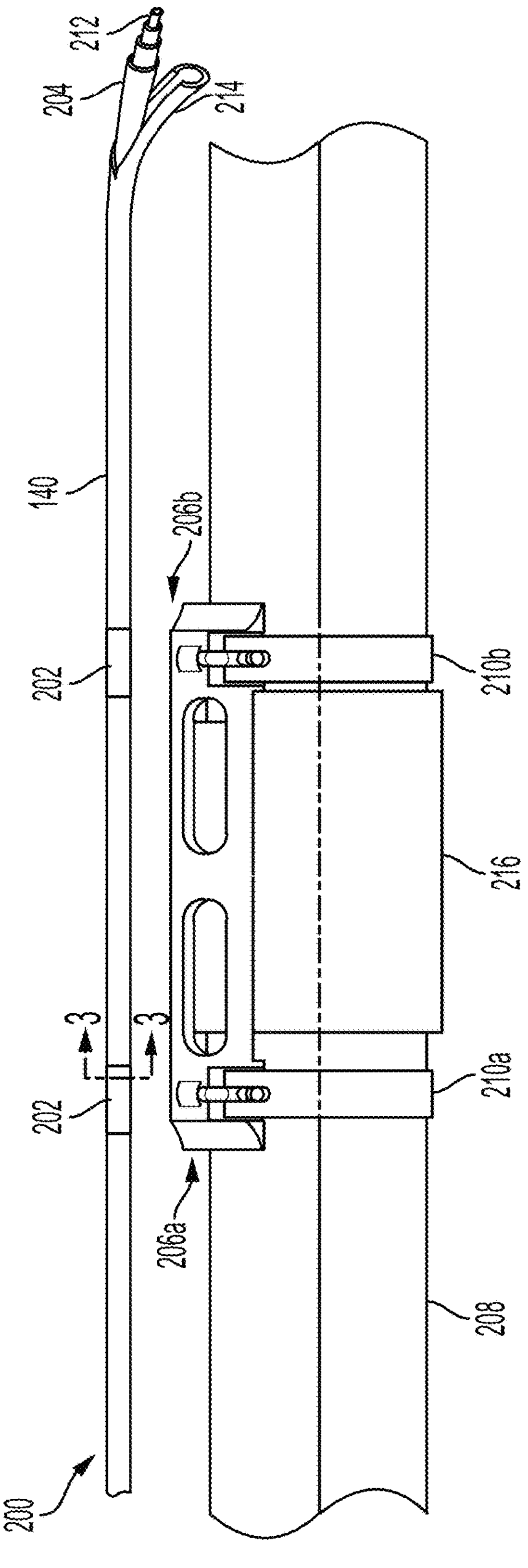
FIG. 2 is a schematic of a system for supplying power to electrical equipment using a TEC with a conductive bridging component according to one example of the present disclosure.

FIG. 2 is a schematic of a system 200 for supplying power to electrical equipment using a Tubing Encapsulated Conductor (TEC) 140 with a conductive bridging component 202 according to one example of the present disclosure. The system 200 can include a tubing 208, which may be positioned in a wellbore, such as the wellbore 122 depicted in FIG. 1. In some examples, the tubing 208 can be production tubing, such as the production tubing string 118 depicted in FIG. 1. The TEC 140 can be mechanically and electrically coupled to the tubing 208. For example, at locations 206*a-b* along the tubing 208, the TEC 140 can be coupled to the tubing 208 via cross-coupling clamps 210*a-b* at a coupling 216 between sections of the tubing 208. An electrical coupling may be established between a metal sheath 204 and the tubing 208 by way of the conductive bridging component 202.

During a wellbore operation, such as a deployment operation, electrical equipment can be deployed downhole in the wellbore. The TEC 140 can electrically couple a power source associated with the wellbore and electrical equipment located downhole within the wellbore during deployment. The power source can be a generator or other suitable power source positioned at a surface of the wellbore. The electrical equipment can be tubing-conveyed, electrically-operated completions equipment or other suitable downhole electrical equipment. Examples of the electrical equipment can include pumps, downhole monitoring tools, or other suitable equipment.

The TEC 140 can include one or more interior wires 212 for transmitting electric power from the power source to the downhole electrical equipment. The TEC 140 can also include the metal sheath 204 around the one or more interior wires. The metal sheath 204 can act as a ground for a circuit that includes the power source, the TEC 140, and the electrical equipment. But the metal sheath 204 can be characterized by high electrical resistance, which can increase power requirements for supplying power to the electrical equipment via the TEC 140. To reduce the electrical resistance, the conductive bridging component 202 may be added to the TEC 140 to facilitate the electrical coupling between the metal sheath 204 and the tubing 208. To facilitate the electrical coupling, the conductive bridging component 202 can be made of or include conducting materials, such as copper or other conducting materials with a low resistance. The conducting materials of the conductive bridging component 202 can pierce an encapsulation layer 214 of the TEC 140 to contact the metal sheath 204.

The electrical coupling of the metal sheath 204 and the tubing 208 can occur at locations 206*a-b* and any other locations along the tubing 208 that is in contact with a conductive bridging component 202 of the TEC 140. Due to the electrical coupling, the tubing 208 can act as a ground for the circuit. Thus, a positive electrical path can flow from the power source to the electrical equipment via the one or more interior wires. Then, a ground side electrical path is provided from the electrical equipment, through the metal sheath and the tubing 208, to the power source. The electrical resistance of the metal sheath can be greater than an electrical resistance of the tubing. Therefore, by electrically coupling the metal sheath and the tubing 208 via the conductive bridging component 202, electrical resistance can be reduced, and the electrical equipment can be powered more efficiently.

Figure 3:
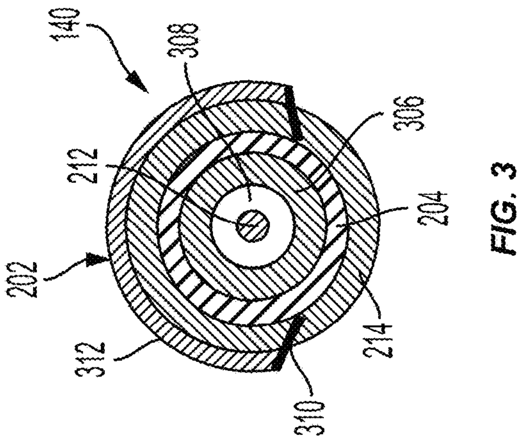
FIG. 3 is a schematic of the TEC of FIG. 2 with the conductive bridging component for supplying power to electrical equipment according to one example of the present disclosure.

FIG. 3 is a schematic of a cross-section of the TEC 140 with the conductive bridging component for supplying power to electrical equipment according to one example of the present disclosure. The TEC 140 can supply power to downhole tools during wellbore operations, such as deployment, completion, and production operations.

The TEC 140 can include the interior wire 212 made of a conducting material such as copper, copper alloy, or aluminum. The interior wire 212 can be the central component of the TEC 140, which carries electrical current. The TEC 140 can also include an insulated tubing 308 which can surround the interior wire 212 to provide electrical and mechanical insulation and protection for the interior wire 212. The insulated tubing 308 can be made of any suitable insulating material including but not limited to polyethylene, polypropylene, or epoxy resins. The TEC 140 can further include the metal sheath 204, which can further protect the interior wire 212 by providing a pressure barrier between the interior wire and a wellbore environment. The metal sheath 204 may be made of copper, aluminum, or steel alloys or of other suitable materials. Additionally, a filling material 306, such as epoxy resin, polyurethane, or silicone, can fill a void between the insulated tubing 308 and the metal sheath 204 to maintain a position of the interior wire 212 within the TEC 140.

The TEC 140 can further include the encapsulation layer 214, which can be an outermost layer of the TEC 140. The encapsulation layer 214 can provide vibration dampening and enable some deformation of the TEC 140. The conductive encapsulation layer 214 can be made of a polymer or other suitable materials. In an example, the conductive bridging component 202 can include prongs 310 that puncture the encapsulation layer 214 in such a way that the prongs 310 are make electrically conductive contact with the metal sheath 204. The prongs 310 may be made from a conductive material, such as copper, aluminum, or a steel alloy. Other conductive materials may also be used. In some examples, the prongs 310 may be made from a material that is more ductile than the metal sheath 204 so as to puncture the encapsulation layer 214 without harming the structure of the metal sheath 204. That is, the prongs 310 are deformable against the metal sheath 204. In additional examples, the prongs 310 may be a conductive component such as conductive wires that are threaded through the encapsulation layer to contact the metal sheath 204. The conductive bridging component 202 may also include a conductive surface 312 in electrical communication with the prongs 310. The conductive surface 312 may be positioned upon installation of the conductive bridging component 202 at the TEC 140 such that the conductive surface 312 is able to maintain contact with the tubing 208 while the tubing and the tubing encapsulated conductor are deployed within the wellbore.

The conductive bridging component 202 may be installed on the TEC 140 during deployment of the TEC 140 within the wellbore 122, or the conductive bridging component 202 may be installed on the TEC 140 as the TEC 140 is wound onto the drum 120. Further, including two or more conductive bridging components 202 on the TEC 140 may enable verification testing of a conductive path between the conductive bridging components 202 and the metal sheath 204. To reduce the return path resistance of the metal sheath 204, the conductive bridging components 202 can be installed along the TEC 140 every other coupling 216 of the tubing 208. Other numbers of joins for addition of the conductive bridging components 202 may also be used. For example, every coupling 216, every third coupling 216, every fourth coupling 216, every fifth coupling 216, or an irregular gap in the number of couplings 216 may include the conductive bridging components 202.

Figure 4:
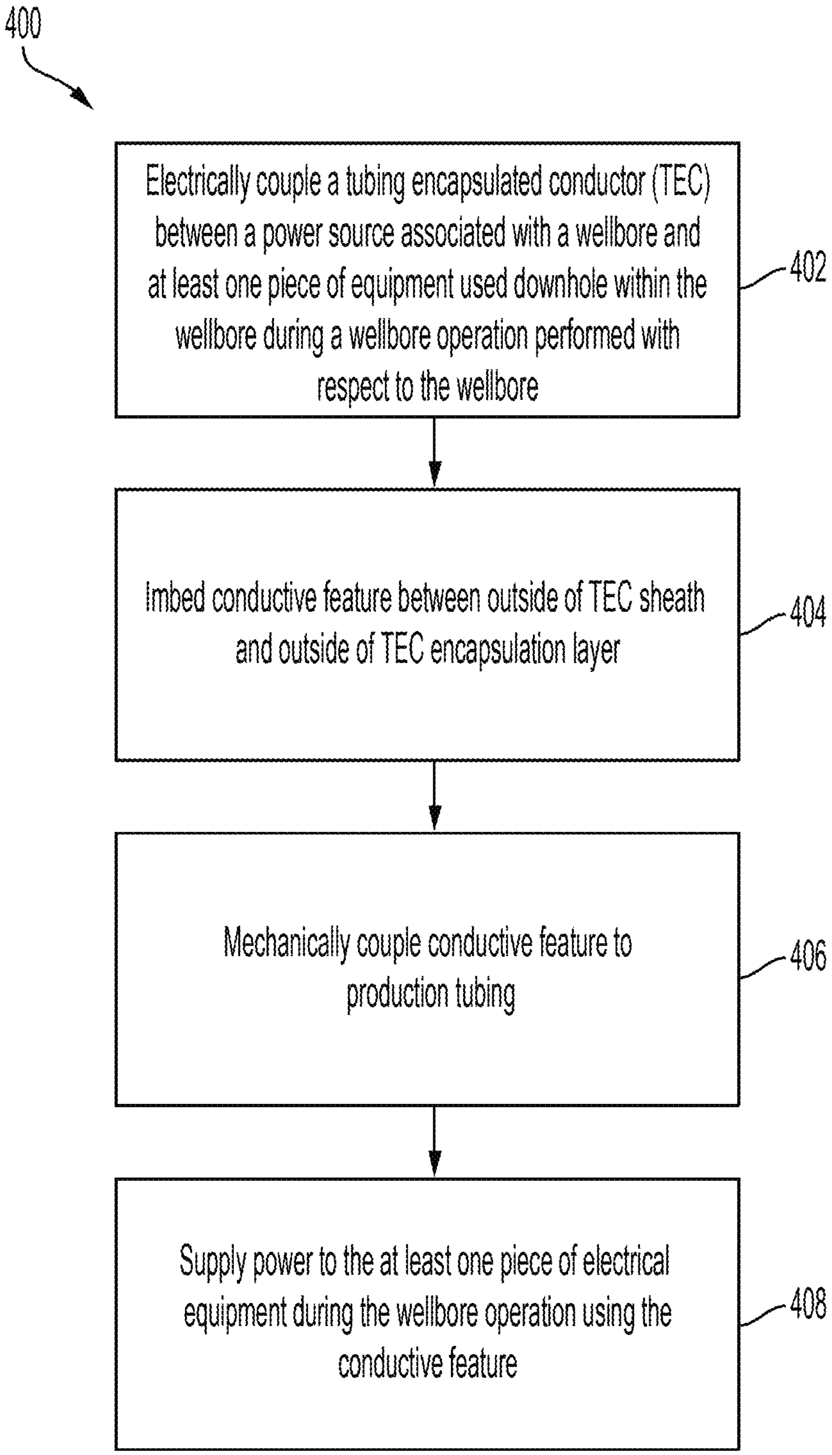
FIG. 4 is a flowchart of a process for supplying power to electrically operated equipment using a TEC with a conductive bridging component according to one example of the present disclosure.

FIG. 4 is a flowchart of a process for supplying power to electrical equipment using the TEC 140 with a conductive bridging component 202 according to one example of the present disclosure. FIG. 4 is described with reference to FIGS. 1-3.

At block 402, the process 400 involves electrically coupling the TEC 140 between a power source 104 associated with a wellbore 122 and at least one piece of electrical equipment 138 used downhole within the wellbore 122 during a wellbore operation performed with respect to the wellbore 122. The wellbore operation can be a deployment operation in which the electrical equipment 138 is being deployed into the wellbore 122. The power source 104 can be at a surface of the wellbore 122 and may include a generator, connection to an electrical grid, or another suitable power source. The electrical equipment 138 can include sensors, valves, pumps, or other suitable electrically operated downhole equipment used for wellbore operations.

At block 404, the process 400 involves imbedding a conductive feature, such as the conductive bridging component 202, between the metal sheath 204 and an outer-surface of the encapsulation layer 212 of the TEC 140. The conductive feature may enable electrical coupling between the metal sheath 204 and another conductive surface, such as the tubing 208.

At block 406, the process 400 involves mechanically coupling the conductive feature to the production tubing 208. The conductive bridging component 202 may be coupled to the production tubing using cross-coupling claims 210. For example, the cross-coupling claims 210 may maintain the conductive bridging components 202 in contact with the tubing 208.

At block 408, the process 400 involves supplying power to the at least one piece of electrical equipment 138 during the wellbore operation via the tubing encapsulated conductor 140. Current can be transmitted from the power source 104 to the electrical equipment 138 via at least one interior wire of the tubing encapsulated conductor 140. The current can further return to the power source 104 via the tubing 208 using a conductive path from the metal sheath 204, through the conductive bridging component 202, and to the tubing 208. This conductive path may enable a lower-resistance ground path during a deployment operation of the electrical equipment 138 than through the metal sheath 204 alone.

In some aspects, systems, methods, or tubing encapsulated conductors for supplying power to downhole equipment are provided according to one or more of the following examples:

Example 1 is a system comprising: a production tubing string positionable downhole in a wellbore; a tubing encapsulated conductor, wherein at least a portion of the tubing encapsulated conductor is positionable downhole in the wellbore to contact the production tubing string at one or more locations along a length of the production tubing string, the tubing encapsulated conductor comprising: at least one interior wire positionable to transmit electric power from a power source associated with the wellbore to at least one piece of electrical equipment during a wellbore operation performed with respect to the wellbore, the at least one piece of electrical equipment positionable downhole in the wellbore; a metal sheath positionable around the at least one interior wire; an encapsulation layer positionable on an outer side of the metal sheath; and a conductive bridging component positionable to pierce the encapsulation layer to contact the metal sheath and to facilitate an electrical coupling between the metal sheath and the production tubing string at one of the one or more locations along the length of the production tubing string.

Example 2 is the system of example 1, wherein the conductive bridging component comprises: at least one conductive component positionable to pierce the encapsulation layer; and at least one conductive surface in electrical communication with the at least one conductive component and positionable to maintain contact with the production tubing string while the production tubing string and the tubing encapsulated conductor are deployed within the wellbore.

Example 3 is the system of example(s) 1-2, further comprising: one or more cross-coupling clamps positionable at the one or more locations along the length of the production tubing string, wherein at least one of the one or more cross-coupling clamps is positionable to electrically and mechanically couple the tubing encapsulated conductor, the conductive bridging component, and the production tubing string.

Example 4 is the system of example(s) 1-3, wherein the tubing encapsulated conductor further comprises at least one insulated tubing positionable around the at least one interior wire to provide electrical and mechanical protection for the at least one interior wire.

Example 5 is the system of example(s) 1-4, wherein the tubing encapsulated conductor further comprises a filling material positionable between the at least one interior wire and the metal sheath to maintain a position of the at least one interior wire within the tubing encapsulated conductor.

Example 6 is the system of example(s) 1-5, wherein the wellbore operation comprises a production tubing string deployment operation.

Example 7 is the system of example(s) 1-6, wherein a length of the tubing encapsulated conductor is positionable on a drum associated with the wellbore, wherein one or more additional conductive bridging components are positionable to facilitate a plurality of electrical couplings between a plurality of drum layers of the length of the tubing encapsulated conductor on the drum.

Example 8 is a tubing encapsulated conductor comprising: at least one interior wire positionable to transmit electric power from a power source associated with a wellbore to at least one piece of electrical equipment during a wellbore operation performed with respect to the wellbore, the at least one piece of electrical equipment positionable downhole in the wellbore; a metal sheath positionable around the at least one interior wire; an encapsulation layer positionable on an outer side of the metal sheath; and a conductive bridging component positionable to pierce the encapsulation layer to contact the metal sheath and to facilitate an electrical coupling between the metal sheath and a production tubing string at a location along a length of the production tubing string, the production tubing string positionable downhole in the wellbore.

Example 9 is the tubing encapsulated conductor of example 8, wherein the conductive bridging compoonent comprises: at least one prong positionable to pierce the encapsulation layer; and at least one conductive surface in electrical communication with the at least one prong and positionable to maintain contact with the production tubing string while the production tubing string and the tubing encapsulated conductor are deployed within the wellbore.

Example 10 is the tubing encapsulated conductor of example(s) 8-9, further comprising at least one cross-coupling clamp positionable at the location, wherein the at least one cross-coupling clamp is positionable to electrically and mechanically couple the tubing encapsulated conductor, the conductive bridging component, and the production tubing string at the location of the production tubing string.

Example 11 is the tubing encapsulated conductor of example(s) 8-10, further comprising at least one insulated tubing positionable around the at least one interior wire to provide electrical and mechanical isolation for the at least one interior wire.

Example 12 is the tubing encapsulated conductor of example(s) 8-11, further comprising a filling material positionable between the at least one interior wire and the metal sheath to maintain a position of the at least one interior wire within the tubing encapsulated conductor.

Example 13 is the tubing encapsulated conductor of example(s) 8-12, wherein the wellbore operation comprises a production tubing string deployment operation.

Example 14 is the tubing encapsulated conductor of example(s) 8-13, wherein a length of the tubing encapsulated conductor is positionable on a drum associated with the wellbore, wherein at least one additional conductive bridging component is positionable on the length of the tubing encapsulated conductor to facilitate one or more electrical couplings between one or more drum layers of the length of the tubing encapsulated conductor on the drum.

Example 15 is a method comprising: electrically coupling a tubing encapsulated conductor between a power source associated with a wellbore and at least one piece of electrical equipment used downhole within the wellbore during a wellbore operation performed with respect to the wellbore; installing a conductive bridging component at a location of the tubing encapsulated conductor, the conductive bridging component electrically coupling with a metal sheath of the tubing encapsulated conductor; and controlling a supply of power to the at least one piece of electrical equipment during the wellbore operation via the tubing encapsulated conductor, wherein current is transmitted from the power source to the at least one piece of electrical equipment via at least one interior wire of the tubing encapsulated conductor, and wherein the current returns to the power source via a production tubing string positioned downhole in the wellbore, wherein the production tubing string is electrically coupled to a metal sheath of the tubing encapsulated conductor via the conductive bridging component.

Example 16 is the method of example 15, wherein the conductive bridging component comprises: at least one conductive component that pierces an encapsulation layer of the tubing encapsulated conductor; and at least one conductive surface in electrical communication with the at least one conductive component and in contact with the production tubing string.

Example 17 is the method of example(s) 15-16, further comprising: clamping the tubing encapsulated conductor to the production tubing string using a plurality of cross-coupling clamps, wherein the conductive bridging component is coupled to the production tubing string using one of the plurality of cross-coupling clamps.

Example 18 is the method of example(s) 15-17, wherein the tubing encapsulated conductor further comprises at least one insulated tubing positioned around each of the at least one interior wire to provide electrical and mechanical isolation for the at least one interior wire.

Example 19 is the method of examples 15-18, wherein the tubing encapsulated conductor further comprises a filling material positioned between the at least one interior wire and the metal sheath to maintain a position of the at least one interior wire within the tubing encapsulated conductor.

Example 20 is the method of examples 15-19, wherein the wellbore operation is a production tubing string deployment operation.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a production tubing string positionable downhole in a wellbore;

a tubing encapsulated conductor, wherein at least a portion of the tubing encapsulated conductor is positionable downhole in the wellbore to contact the production tubing string at one or more locations along a length of the production tubing string, the tubing encapsulated conductor comprising:

at least one interior wire positionable to transmit electric power from a power source associated with the wellbore to at least one piece of electrical equipment during a wellbore operation performed with respect to the wellbore, the at least one piece of electrical equipment positionable downhole in the wellbore;

a metal sheath positionable around the at least one interior wire;

an encapsulation layer positionable on an outer side of the metal sheath; and a conductive bridging component positionable to pierce the encapsulation layer to contact the metal sheath and to facilitate an electrical coupling between the metal sheath and the production tubing string at one of the one or more locations along the length of the production tubing string.

2. The system of claim 1, wherein the conductive bridging component comprises:

at least one conductive component positionable to pierce the encapsulation layer; and at least one conductive surface in electrical communication with the at least one conductive component and positionable to maintain contact with the production tubing string while the production tubing string and the tubing encapsulated conductor are deployed within the wellbore.

3. The system of claim 1, further comprising:

one or more cross-coupling clamps positionable at the one or more locations along the length of the production tubing string, wherein at least one of the one or more cross-coupling clamps is positionable to electrically and mechanically couple the tubing encapsulated conductor, the conductive bridging component, and the production tubing string.

4. The system of claim 1, wherein the tubing encapsulated conductor further comprises at least one insulated tubing positionable around the at least one interior wire to provide electrical and mechanical protection for the at least one interior wire.

5. The system of claim 1, wherein the tubing encapsulated conductor further comprises a filling material positionable between the at least one interior wire and the metal sheath to maintain a position of the at least one interior wire within the tubing encapsulated conductor.

6. The system of claim 1, wherein the wellbore operation comprises a production tubing string deployment operation.

7. The system of claim 1, wherein a length of the tubing encapsulated conductor is positionable on a drum associated with the wellbore, wherein one or more additional conductive bridging components are positionable to facilitate a plurality of electrical couplings between a plurality of drum layers of the length of the tubing encapsulated conductor on the drum.

8. A tubing encapsulated conductor comprising:

at least one interior wire positionable to transmit electric power from a power source associated with a wellbore to at least one piece of electrical equipment during a wellbore operation performed with respect to the wellbore, the at least one piece of electrical equipment positionable downhole in the wellbore;

a metal sheath positionable around the at least one interior wire;

an encapsulation layer positionable on an outer side of the metal sheath; and a conductive bridging component positionable to pierce the encapsulation layer to contact the metal sheath and to facilitate an electrical coupling between the metal sheath and a production tubing string at a location along a length of the production tubing string, the production tubing string positionable downhole in the wellbore.

9. The tubing encapsulated conductor of claim 8, wherein the conductive bridging component comprises:

at least one prong positionable to pierce the encapsulation layer; and at least one conductive surface in electrical communication with the at least one prong and positionable to maintain contact with the production tubing string while the production tubing string and the tubing encapsulated conductor are deployed within the wellbore.

10. The tubing encapsulated conductor of claim 8, further comprising at least one cross-coupling clamp positionable at the location, wherein the at least one cross-coupling clamp is positionable to electrically and mechanically couple the tubing encapsulated conductor, the conductive bridging component, and the production tubing string at the location of the production tubing string.

11. The tubing encapsulated conductor of claim 8, further comprising at least one insulated tubing positionable around the at least one interior wire to provide electrical and mechanical isolation for the at least one interior wire.

12. The tubing encapsulated conductor of claim 8, further comprising a filling material positionable between the at least one interior wire and the metal sheath to maintain a position of the at least one interior wire within the tubing encapsulated conductor.

13. The tubing encapsulated conductor of claim 8, wherein the wellbore operation comprises a production tubing string deployment operation.

14. The tubing encapsulated conductor of claim 8, wherein a length of the tubing encapsulated conductor is positionable on a drum associated with the wellbore, wherein at least one additional conductive bridging component is positionable on the length of the tubing encapsulated conductor to facilitate one or more electrical couplings between one or more drum layers of the length of the tubing encapsulated conductor on the drum.

15. A method comprising:

electrically coupling a tubing encapsulated conductor between a power source associated with a wellbore and at least one piece of electrical equipment used downhole within the wellbore during a wellbore operation performed with respect to the wellbore;

installing a conductive bridging component at a location of the tubing encapsulated conductor, the conductive bridging component electrically coupling with a metal sheath of the tubing encapsulated conductor; and controlling a supply of power to the at least one piece of electrical equipment during the wellbore operation via the tubing encapsulated conductor, wherein current is transmitted from the power source to the at least one piece of electrical equipment via at least one interior wire of the tubing encapsulated conductor, and wherein the current returns to the power source via a production tubing string positioned downhole in the wellbore, wherein the production tubing string is electrically coupled to the metal sheath of the tubing encapsulated conductor via the conductive bridging component.

16. The method of claim 15, wherein the conductive bridging component comprises:

at least one conductive component that pierces an encapsulation layer of the tubing encapsulated conductor; and at least one conductive surface in electrical communication with the at least one conductive component and in contact with the production tubing string.

17. The method of claim 15, further comprising:

clamping the tubing encapsulated conductor to the production tubing string using a plurality of cross-coupling clamps, wherein the conductive bridging component is coupled to the production tubing string using one of the plurality of cross-coupling clamps.

18. The method of claim 15, wherein the tubing encapsulated conductor further comprises at least one insulated tubing positioned around each of the at least one interior wire to provide electrical and mechanical isolation for the at least one interior wire.

19. The method of claim 15, wherein the tubing encapsulated conductor further comprises a filling material positioned between the at least one interior wire and the metal sheath to maintain a position of the at least one interior wire within the tubing encapsulated conductor.

20. The method of claim 15, wherein the wellbore operation is a production tubing string deployment operation.

* * * * *